United States Patent Office 3,849,355
Patented Nov. 19, 1974

3,849,355
AGGREGATE COMPOSITION CONTAINING SYNTHETIC THERMOPLASTIC RESIN PELLETS OR FRAGMENTS
Kaoru Yamaguchi and Takashi Saito, Yokohama, Japan, assignors to Nippon Zeon Company, Ltd., Tokyo, Japan
No Drawing. Continuation of abandoned application Ser. No. 168,722, Aug. 3, 1971. This application June 12, 1973, Ser. No. 369,180
Claims priority, application Japan, Aug. 6, 1970, 45/68,324; Oct. 24, 1970, 45/93,169
Int. Cl. C08f 45/04, 45/52
U.S. Cl. 260—28.5 R          7 Claims

ABSTRACT OF THE DISCLOSURE

An improved aggregate or road paving composition comprising an admixture of aggregate and a binder selected from bituminous material and petroleum resins wherein from 3 to 75% by weight of the aggregate is replaced with synthetic resin particles.

This application is a continuation application of application Ser. No. 168,722, filed Aug. 3, 1971, now abandoned.

BACKGROUND OF THE INVENTION

This invention relates to an improved composition comprising aggregate, synthetic resin particles and binders. More particularly, this invention relates to improved aggregate compositions, wherein a portion of the aggregate in the composition is replaced by thermoplastic synthetic resin particles.

DESCRIPTION OF THE PRIOR ART

Generally, road paving compositions are prepared by one of two methods. The first method, known as the heat-mixing method, comprises heating a mixture of crushed stone and sand, which are premeasured to obtain a prescribed particulate distribution, to remove the moisture and to facilitate the mixing of the crushed stone and sand with a binder, such as bituminous material; the crushed stone and sand are then charged to a mixer and kneaded for at least 5 seconds with a filler; and finally the binder and rubber latex, if any, are charged to the mixer with mixing continuing until the binder has coated all of the aggregate. Usually, the paving composition is obtained by mixing for 40 to 50 seconds at a temperature of about 150° C. to about 160° C. This paving composition is transported in its heated state and spread over the rod surface as the base or sub-base, with an asphalt finisher and subsequently rolled with a road roller and tire roller.

The second method, known as the permeation method, comprises uniformly spraying a pre-determined amount of binder onto the aggregate so that the binder permeates the interstices between the aggregate and creates a stable layer by the engagement of the aggregate and the binding force of the binder. This method includes both the heating of the binder before spraying and the spraying of the binder at ambient temperature without heating.

The aggregates used with the binder must adhere well to the binder, and the grade and particle size of the aggregates greatly affect the performance of the resulting pavement. A mixture of crushed stone, crushed round stones, gravel, slag, sand and filler is usually used as the aggregate. Crushed stone is obtained by crushing rocks, and when it has just been crushed by a crusher and is in its as-crushed state, it is called the crusher run. Crushed round stones are those obtained by crushing either round stones or gravel and have a particle size such that the stones do not pass through a 5 mm. sieve, at least 40% by weight of these particles having at least one broken surface. Gravel is classified by its source such as river, bank run, mire or seashore, and gravels which include sand are called run-of-the-mill gravel. Slag is formed by crushing air-cooled blast furnace slag, and has a uniform grade and density. There are two types of sand, natural and crushed sand. Natural sand is classified in accordance with its source, while crushed sand is made by crushing rock and round stones. The sand must be clean and have suitable hardness, durability and particle size for its intended use and must not contain a deleterious amount of trash, mud, organic matter, etc. Filler is a finely divided powder of limestone, slaked lime, portland cement or igneous rock and must not contain more than 1.0% mositure.

The binder is the material which binds the aggregate together and, upon hardening, must be capable of maintaining the strength of the pavement in cooperation with the aggregate. Bituminous materials such as straight asphalt, asphalt emulsion, cutback asphalt and tar, as well as petroleum resins are generally used as the binder.

When binder coated aggregate contacts water, the binder tends to be stripped from the surface of the aggregate. Further, the adhesiveness between the aggregate and the binder depends on the properties of the aggregate as well as the properties of the binder. Therefore, in preparing the paving material, the selection of aggregate components and determination of their composition and the choice of the binder and the optimum amount in which it is to be incorporated are of utmost importance.

Also, in recent years, the widespread use of synthetic plastics has created a disposal problem since these plastics are not biodegradable and maintain their composition indefinitely. The obvious pollution problem created by these plastics could be alleviated if some economical use for these waste plastics could be found.

It is, therefore, within the above environment and background that the composition of the present invention was developed.

BRIEF SUMMARY AND OBJECTS OF THE PRESENT INVENTION

The improved aggregate or surfacing composition of the present invention comprises a mixture of aggregate and a binder selected from bituminous materials or petroleum resins wherein from 3 to 75% by weight of the aggregate is replaced with particles of a synthetic thermoplastic resin.

It is, therefore, the primary object of the present invention to provide an improved aggregate paving composition.

It is another object of the present invention to provide an aggregate composition which includes from 3 to 75% by weight of particles of a thermoplastic resin.

It is still a further object of the present invention to provide an effective use for scrap plastic articles.

It is still a further object of the present invention to provide a simple means for producing colored paving surfaces.

Still further objects and advantages of the composition of the present invention will become more apparent from the following detailed description thereof.

DETAILED DESCRIPTION OF THE PREFERRED EMBODIMENTS

It has now been found in accordance with the composition of the present invention that when a portion of the aggregate is replaced with particles of synthetic resin, these particles being either pellets produced by molding a synthetic resin or fragments produced by crushing shaped articles of synthetic resins, the synthetic resin does not degrade or decompose during the preparation of this paving material by the heat-mixing method, if the conditions allow mixing to be completed in a short period of time. Instead of decomposing or being degraded, a portion of the synthetic resin particles either deform of fuse to increase the adhesiveness between the synthetic particles and the binder to produce an excellent paving material from which the binder cannot be easily stripped. It has also been discovered that even when mixing is conducted at ambient temperature, there is unexpected adhesiveness between the synthetic resin particles and the binder, if the resin particles have at least one broken or roughened surface.

In order to produce a strong paving material, it is necessary to use aggregate having both great strength and great adhesiveness to the binder used, such as gravel, sand, and crushed stone. However, prior to the present invention, it was unexpected that thermoplastic synthetic resin particles could have sufficient strength to replace some or all of the conventional aggregate, have sufficient adhesion between the synthetic resin particles and the binder to be suitable for use as a paving material, and have sufficient heat resistance to withstand the heating in the heat-mixing method.

The thermoplastic synthetic resin particles used in the composition of the present invention are solids having a maximum lengthwise diameter of about 1–20 mm., and preferably 1–13 mm. Suitable particles include pellets produced by molding thermo-plastic resins such as vinyl chloride resins, polyethylene, polypropylene, polystyrene, acrylonitrile-butadiene-styrene and methacrylic resins; or fragments obtained by crushing shaped articles made from these resins, such as sheets, pipes, containers, as well as mechanical parts, electrical parts and miscellaneous good, in a suitable crusher such as a jaw crusher or impeller breaker.

If synthetic resin powders are used in the aggregate composition instead of a particulate material such as pellets or fragments, these powdery synthetic resins either melt or decompose during the heat-mixing process of making the paving material and the paving material is completely useless.

The amount of aggregate replaced depends on the composition of the aggregate and is usually an amount from 3 to 50% by weight of the total aggregate weight when the aggregate replaced has a large particle size; i.e., crushed stone and gravel. The replacement rate for such large aggregate is from 30 to 40% by weight when the composition is to be used for paving roads for automotive traffic necessitating a high safety requirement. When aggregate having a smaller particle size; i.e., sand, is to be replaced, from 3 to 75% by weight of the total aggregate weight can be usually replaced, while if the safety requirements are high, the rate of replacement should be up to a maximum of 50% by weight. At amounts of thermoplastic resin below the minimum; i.e., 3% there is virtually no improvement of the physical properties of the aggregate composition and in fact, the physical properties are often less desirable than compositions containing no plastic.

When colored synthetic resin particles are used in the aggregate composition, a colored paving composition is obtained, especially when a petroleum resin is used as the binder, since petroleum resin produces a light-colored paving composition. This embodiment of the composition of the present invention comprises a petroleum resin and aggregate having up to 70% by weight, and preferably up to 50% by weight replaced by particles of colored synthetic resin. In order to produce the color when a darker colored bituminous material is used as the binder, the surface of the compacted mixture must be polished by a grinder or the like to expose the colored synthetic resin particles incorporated in the surfacing material.

Colored pavements have been used in the past for such purposes as beautification; i.e., pedestrian walks, parking areas, parks and shop-lined streets; traffic safety; i.e., as crosswalks, to indicate high accident areas, mark the inside of tunnels, etc., or mark the surface of the roadway, junctions, bus stops, etc. Prior art colored paving composition consists of a naturally colored aggregate, a bituminous material or a petroleum resin and a silica such as sand or limestone having a whitish color, reddish brown colcothar, aluminum particles, vitreous aggregate, fragments of colored china, etc. Colcothar is primarily used because it is inexpensive and does not become discolored and also the color harmonizes with the green lawns of parks or grass planted along the roads. The colored paving composition of the present invention may be produced both when a portion of conventional aggregate is replaced with colored synthetic resin particles, and also when a portion or all of the conventional colored aggregate is replaced with colored synthetic resin particles.

A typical method of preparing the composition of the present invention comprises heating crushed stone or gravel, sand and filler, such as limestone filler, to a temperature of from 170 to 200° C. in a dryer, measuring these materials and charging the same in a mixer and mixing these materials in a dry state. A pre-determined amount of synthetic resin in pellet or fragment form is charged to the mixer during this dry mixing period, either at ambient temperatures or after pre-heating with an added dry mixing period of from 5 to 10 seconds. After completion of the dry mixing, a pre-determined amount of a bituminous material heated to 140–160° C. or a petroleum resin heated to 130–150° C. is sprayed onto the aggregate and synthetic resin pellets or fragments, and the mixture is wet-mixed until the agregates and the synthetic resin pellets or fragments are completely coated with the binder, usually within 30–60 seconds. After completion of these mixing operations, the mixture is discharged and the spreading and compacting of this paving composition are carried out in the customary manner.

The composition of the present invention can be used not only for road paving purposes, but also for the manufacturing of blocks such as tiles and molded articles like terrazzo.

When mold articles like terrazzo are produced, the aggregate, synthetic resin particles and binder mixture are placed in a mold and compacted thoroughly by a hot press or similar apparatus. After the compacted mixture is cooled, it is removed from the mold and its surface is polished by a grinder or the like or shaved off with a lathe or the like, to expose the incorporated synthetic resin particles, thereby producing molded articles like terrazzo.

While any synthetic resin particles within the above-noted classes of resins and particle sizes may be used, it is especially preferred to use colored and nontransparent resin particles.

The composition of the present invention will now be illustrated by the following non-limiting examples wherein all parts and percentages are by weight and temperatures in degrees centigrade.

EXAMPLE 1

The compositions as shown in Table I are formed by heating the premeasured aggregate; i.e., crushed stone, coarse sand, fine sand and limestone filler to 170–190° C., adding the predetermined amount of asphalt (penetration grade 80–100) which was heated to 150–160° C. The synthetic resins were then added except in samples I and V. The aggregate and asphalt were co-mingled until the latter thoroughly coated the former, usually a period of 2 minutes. This mixture was then placed in a mold and, when the temperature fell to 135–145° C., was compacted by tamping.

The Marshall stability test of the mixture consisting of aggregate, i.e., crushed stone, sand, limestone filler and synthetic resin fragments and asphalt was carried out in accordance with ASTM D 1559–62T. The water resistance was tested by means of the Marshall water immersion test, i.e., immersion for 24 hours at 60° C. To check the deformation and deterioration caused by heat, the samples, compacted by tamping, were placed in a 150° C. oven for 2 hours, then cooled to room temperature, and thereafter submitted to the Marshall stability test, noted as the heat resistance test in Table 1.

The composition of the samples and the test results thereof are shown in Table 1. It can be seen that the compositions obtained by compounding the components in accordance with the present invention demonstrate unexpectedly excellent stability and that the water resistance and heat resistance are also very good.

Also, when powdered polyvinyl chloride, powdered polystyrene, and powdered acrylonitrile-butadiene-styrene copolymer were incorporated in the composition instead of the synthetic resin fragments, the former synthetic resins melted and decomposed during the mixing operation.

demonstrate a stability superior to those not including the synthetic resin fragments.

TABLE 3.—PROPERTIES

| Sample | Density (g./cm.³) | Voids (percent) | Rate of asphalt volume (percent) | Stability (kg.) | Flow (l./100 cm.) |
|---|---|---|---|---|---|
| I | 2.328 | 3.24 | 13.63 | 770 | 10 |
| II | 1.950 | 5.34 | 11.42 | 1,840 | 76 |
| III | 1.465 | 8.44 | 8.58 | 1,967 | 103 |
| IV | 1.992 | 3.30 | 11.66 | 3,000 | (*) |
| V | 1.727 | 4.11 | 10.11 | 3,000 | (*) |
| VI | 1.961 | 4.76 | 11.48 | 3,000 | (*) |
| VII | 1.339 | 6.95 | 7.84 | 2,270 | 87 |
| VIII | 1.529 | 4.44 | 8.95 | 3,000 | (*) |

*Test samples were not broken at 3,000 kg.

TABLE 1

| Composition | Density (g./cm.³) | Standard Marshall test | | Marshall water immersion test | | Heat resistance test | |
|---|---|---|---|---|---|---|---|
| | | Stability (kg.) | Flow (l./100 cm.) | Stability (kg.) | Flow (l./100 cm.) | Stability (kg.) | Flow (l./100 cm.) |
| Sample I.—Crushed stone (5-2.5 mm.) 30 wt. pt.; sand (2.5-1.2 mm.) 30 wt. pt.; sand (less than 1.2 mm.) 30 wt. pt.; lime stone filler 10 wt. pt.; asphalt 7 wt. pt. | 2.285 | 449 | 27 | 380 | 23 | | |
| Sample II.—crushed stone (5-2.5 mm.) 30 wt. pt.; ABSª fragments (2.5-1.2 mm.) 30 wt. pt.; sand (less than 1.2 mm.) 30 wt. pt.; lime stone filler 10 wt. pt.; asphalt 7 wt. pt. | 1.636 | 1,788 | 47 | 1,669 | 38 | | |
| Sample III.—Crushed stone (5-2.5 mm.) 30 wt. pt.; ABSª fragments (2.5-1.2 mm.) 15 wt. pt.; sand (2.5-1.2 mm.) 15 wt. pt.; sand (less than 1.2 mm.) 30 wt. pt.; lime stone filler 10 wt. pt.; asphalt 7 wt. pt. | 1.904 | 1.431 | 41 | | | | |
| Sample IV.—Crushed stone (5-2.5 mm.) 30 wt. pt.; PSᵇ fragments (2.5-1.2 mm.) 15 wt. pt.; sand (2.5-1.2 mm.) 15 wt. pt.; sand (less than 1.2 mm.) 30 wt. pt.; lime stone filler 10 wt. pt.; asphalt 7 wt. pt. | 1.917 | 1,924 | 48 | 1,883 | 40 | 2,012 | 27 |
| Sample V.—Crushed stone (10-5 mm.) 30 wt. pt.; crushed stone (5-2.5 mm.) 20 wt. pt.; sand (less than 1.2 mm.) 40 wt. pt.; lime stone filler 10 wt. pt.; asphalt 5.7 wt. pt. | 2.326 | 745 | 33 | 692 | 35 | | |
| Sample VI.—Crushed stone (10-5 mm.) 30 wt. pt.; crushed stone (5-2.5 mm.) 10 wt. pt.; PVCᶜ fragments (5-2.5 mm.) 10 wt. pt.; sand (less than 1.2 mm.) 40 wt. pt.; lime stone filler 10 wt. pt.; asphalt 5.7 wt. pt. | 2.139 | 843 | 37 | 756 | 40 | 832 | 34 |
| Sample VII.—Crushed stone (10-5 mm.) 30 wt. pt.; crushed stone (5-2.5 mm.) 10 wt. pt.; PEᵈ fragments (5-2.5 mm.) 10 wt. pt.; sand (less than 1.2 mm.) 40 wt. pt.; lime stone filler 10 wt. pt.; asphalt 5.7 wt. pt. | 1.997 | 856 | 36 | 763 | 41 | | |
| Sample VIII.—Crushed stone (10-5 mm.) 30 wt pt.; PPᵉ fragments (5-2.5 mm.) 20 wt. pt.; sand (less than 1.2 mm.) 40 wt. pt.; lime stone filler 10 wt. pt.; asphalt 5.7 wt. pt. | 1.725 | 1,384 | 45 | 1,125 | 50 | | |

ª ABS=Acrylo nitrile, butadiene, styrene copolymer.
ᵇ PS=Polystyrene.
ᶜ PVC=Vinyl chloride resin.
ᵈ PE=Polyethylene.
ᵉ PP=Polypropylene.

EXAMPLE 2

The compositions as set forth in Table 2 are compounded using the procedure of Example 1, except the asphalt was heated to 145–160° C. The polypropylene fragments were produced by crushing a polypropylene beer container. The aggregate and the polypropylene particles were thoroughly mixed with the asphalt for about 2 minutes until the aggregates and polypropylene fragments are coated with asphalt. When a relatively large amount of polypropylene was added, i.e., 30–40% by weight of the total aggregate, the temperature of the mixture fell to about 130° C., necessitating additional heating. The mixture was compacted by tamping at a temperature of 145–150° C.

TABLE 2

| Composition (wt. parts) | Sample | | | | | | | |
|---|---|---|---|---|---|---|---|---|
| | I | II | III | IV | V | VI | VII | VIII |
| Crushed stone and coarse sand: | | | | | | | | |
| Crushed stone (10-5 mm.) | 40 | 30 | 10 | 40 | 40 | 40 | 20 | 40 |
| Crushed stone (5-2.5 mm.) | 20 | 20 | 20 | 10 | | 20 | | |
| Sand (2.5-1.2 mm.) | 10 | 10 | 10 | 10 | 10 | | 10 | |
| Polypropylene fragments: | | | | | | | | |
| 10-5 mm. | | 10 | 30 | | | | 20 | |
| 5-2.5 mm. | | | | 10 | 20 | | 20 | 20 |
| 2.5-1.2 | | | | | | 10 | | 10 |
| Fine aggregates: | | | | | | | | |
| Sand (less than 1.2 mm.) | 25 | 25 | 25 | 25 | 25 | 25 | 25 | 25 |
| Limestone filler | 5 | 5 | 5 | 5 | 5 | 5 | 5 | 5 |
| Asphalt | 6 | 6 | 6 | 6 | 6 | 6 | 6 | 6 |

These samples are tested as in Example 1 and the results are shown in Table 3. It can be seen from Table 3 that the paving compositions of the present invention

EXAMPLE 3

The aggregates having the particle sizes as shown in Table 4 were used in accordance with the composition given in Table 5. The crushed stone, sand and limestone filler were first heated at 170–190° C., and mixed with asphalt, penetration grade 80–100, specific gravity 1.025, which had been heated at 140–160° C. The vinyl chloride vinyl acetate copolymer fragments, which were at room temperature, were then added, and this mixture was comingled for about 2 minutes. This mixture was compacted by tamping at three different temperatures, as shown in Table 6. The physical properties of these compositions are shown in Table 6.

TABLE 4

| Aggregate | Crushed stone | Vinyl chloride-vinyl acetate copolymer fragments | Sand | Lime stone filler |
|---|---|---|---|---|
| Particles passing through sieve mesh: | | | | |
| 20 mm., percent | 100 | | | |
| 13 mm., percent | 98.6 | 100 | | |
| 5 mm., percent | 11.8 | 99.1 | 100 | |
| 2.5 mm., percent | 1.4 | 46.2 | 84.0 | |
| 0.6 mm., percent | | 1.4 | 33.0 | |
| 0.3 mm., percent | | | 16.3 | 100 |
| 0.15 mm., percent | | | 6.8 | 97.3 |
| 0.074 mm., percent | | | 2.7 | 81.3 |
| Apparent specific gravity | 2.653 | 1.300 | 2.577 | 2.710 |

TABLE 5

| | Weight parts |
|---|---|
| Crushed stone | 24 |
| Vinyl chloride resin | 13 |
| Sand | 55 |
| Lime stone filler | 8 |
| Asphalt | 7 |

TABLE 6.—PROPERTIES

| Tamping temperature (° C.) | Density (g./cm.³) | Voids (percent) | Rate of asphalt volume (percent) | Stability (kg.) | Flow (l./100 cm.) |
|---|---|---|---|---|---|
| 105–110 | 1,903 | 9.7 | 14.1 | 276 | 46 |
| 125–130 | 2,031 | 3.6 | 15.1 | 795 | 58 |
| 145–150 | 2,082 | 1.2 | 15.4 | 1,431 | 66 |

EXAMPLE 4

The samples as shown in Table 7, except for samples III and IV, were prepared in accordance with the procedure of Example 1, except that the aggregate was heated to 160–180° C. and mixed with a petroleum resin heated to 135–145° C. These samples were molded at 130–140° C. with compacting.

Samples III and IV were prepared by heating the crushed stone, sand, limestone filler and synthetic resin fragments and pellets to 120–140° C. The petroleum resin heated to 135–145° C. was added to this mixture of aggregate and pellets, and mixed until the crushed stone, sand, limestone filler and synthetic resin fragments and pellets were completely coated with the petroleum resin. This mixture was placed in a mold at 130–140° C. and compacted by tamping.

The stability of the mixture of the aggregates and pellets, i.e., crushed stone, sand, limestone filler and synthetic resin fragments and pellets, and the petroleum resin was tested using the Marshall stability test in accordance with ASTM D 1559–62T, with the test results shown in Table 7.

The mixture was then placed in a mold and compacted first by tamping it downward 50 times and then, after turning the mixture upside down, by tamping it downward 50 times, at 150–160° C. The samples were removed from the molds after 24 hours and the Marshall stability of each sample was determined in accordance with ASTM D 1559–62T with the test results shown in Table 9.

TABLE 9

| Sample | Polypropylene fragments (wt. parts) | Density (g./cm.³) | Void (percent) | Stability (kg.) | Flow (l./100 cm.) |
|---|---|---|---|---|---|
| I | 0 | 2.261 | 6.4 | 720 | 21 |
| II | 2 | 2.160 | 7.6 | 691 | 22 |
| III | 3 | 2.116 | 8.0 | 1,018 | 36 |
| IV | 5 | 2.049 | 8.2 | 1,342 | 44 |
| V | 8 | 1.970 | 8.5 | 1,610 | 51 |

Table 9 shows that the compositions of samples III, IV and V, having at least 3% by weight of the synthetic thermoplastic resin particles based on the total aggregate, have a remarkable improvement in Marshall stability.

What is claimed is:

1. In a composition useful as a paving material comprising in admixture aggregate and a binder selected from the group consisting of a bituminous material and a petroleum resin, the improvement wherein from 3–75% by

TABLE 7

| Composition | Density (g./cm.³) | Theoretical density (g./cm.³) | Voids (percent) | Stability (kg.) | Flow (l./100 cm.) |
|---|---|---|---|---|---|
| Sample I.—Crushed stone (5–2.5 mm.) 30 wt. pt.; sand (2.5–1.2 mm.) 30 wt. pt.; sand (1.2–0.6 mm.) 10.7 wt. pt.; sand (less than 0.6 mm.) 19.3 wt. pt.; lime stone filler 10 wt. pt.; petroleum resin 7.0 wt. pt. | 2.272 | 2.420 | 6.1 | 451 | 27 |
| Sample II.—Crushed stone (5–2.5 mm.) 15 wt. pt.; PVC fragments (5–2.5 mm.) 15 wt. pt.; sand (2.6–1.2 mm.) 30 wt. pt.; sand (1.2–0.6 mm.) 10.7 wt. pt.; sand (less than 0.6 mm.) 19.3 wt. pt.; lime stone filler 10 wt. pt.; petroleum resin 7.0 wt. pt. | 1.929 | 2.134 | 9.6 | 657 | 38 |
| Sample III.— Crushed stone (5–2.5 mm.) 10 wt. pt.; PVC fragments (5–2.5 mm.) 20 wt. pt.; sand (2.5–1.2 mm.) 10 wt. pt.; PVC fragments (2.5–1.2 mm.) 20 wt. pt.; PVC fragments (1.2–0.6 mm.) 10.7 wt. pt.; sand (less than 0.6 mm.) 19.3 wt. pt.; lime stone filler 10 wt. pt.; petroleum resin 7.0 wt. pt. | 1.465 | 1.664 | 11.8 | 1,013 | 74 |
| Sample IV.—PVC fragments (5–2.5 mm.) 30 wt. pt.; PVC fragments (2.5–1.2 mm.) 30 wt. pt.; PVC fragments (1.2–0.6 mm.) 10.7 wt. pt.; sand (less than 0.6 mm.) 19.3 wt. pt.; lime stone filler 10 wt. pt.; petroleum resin 7.0 wt. pt. | 1.287 | 1.481 | 13.1 | 1,267 | 69 |
| Sample V.—Crushed stone (5–2.5 mm.) 15 wt. pt.; phenol resin fragments (5–2.5 mm.) 15 wt. pt.; sand (2.5–1.2 mm.) 30 wt. pt.; sand (1.2–0.6 mm.) 10.7 wt. pt.; sand (less than 0.6 mm.) 19.3 wt. pt.; lime stone filler 10 wt. pt.; petroleum resin 7.0 wt. pt. | 2.002 | 2.165 | 7.5 | 402 | 26 |
| Sample VI.—Crushed stone (5–2.5 mm.) 15 wt. pt.; ABS pellets (5–2.5 mm.) 15 wt. pt.; sand (2.5–1.2 mm.) 10.7 wt. pt.; sand (less than 0.6 mm.) 19.3 wt. pt.; lime stone filler 10 wt. pt.; petroleum resin 7.0 wt. pt. | 1.656 | 1.729 | 4.2 | 1,396 | 48 |

EXAMPLE 5

The compositions as shown in Table 8 were prepared by heating the mixture of crushed stone, sand and limestone filler to about 200° C. in an air-oven, followed by mixing with asphalt so that the aggregate was coated with the asphalt. The polypropylene fragments produced by crushing a thick-shelled beer container were then added to the mixture and mixed until the fragments were substantially coated with the asphalt.

TABLE 8

| Composition (in wt. pts.) | Sample I | II | III | IV | V |
|---|---|---|---|---|---|
| Crushed stone (13–5 mm.) | 35 | 35 | 35 | 35 | 35 |
| Crushed stone (5–2.5 mm.) | 20 | 18 | 17 | 15 | 12 |
| Polypropylene fragments (5–2.5 mm.) | 0 | 2 | 3 | 5 | 8 |
| Sand (less than 2.5 mm.) | 40 | 40 | 40 | 40 | 40 |
| Limestone filler | 5 | 5 | 5 | 5 | 5 |
| Asphalt | 6 | 6 | 6 | 6 | 6 | weight of said aggregate is replaced with solid synthetic thermoplastic resin particles selected from the group consisting of vinyl chloride resins, polyethylene, polypropylene, polystyrene, acrylonitrile-butadiene-styrene and methacrylic resins in the form of pellets or fragments having a maximum lengthwise diameter of about 1–20 mm. in said admixture.

2. The composition of claim 1 wherein the synthetic thermoplastic resin particles are fragments molded pellets.

3. The composition of claim 1 wherein the synthetic thermoplastic resin particles are obtained by crushing molded articles of the synthetic thermoplastic resin.

4. The composition of claim 1 wherein the bituminous material is asphalt.

5. The composition of claim 1 wherein the bituminous material is tar.

6. The composition of claim 1 wherein the synthetic thermoplastic resin particles are colored.

7. The composition of claim 1 wherein the synthetic thermoplastic resin particles have a maximum lengthwise diameter of 1-13 mm.

References Cited

UNITED STATES PATENTS

| | | | |
|---|---|---|---|
| 3,272,098 | 9/1966 | Buchholtz et al. | 260—37 N |
| 3,585,162 | 6/1971 | Sapp | 260—37 N |
| 3,555,827 | 1/1971 | McConnaughay | 106—281 R |
| 3,637,558 | 1/1972 | Verdol | 260—28.5 AS |
| 3,072,593 | 1/1963 | Marx et al. | 106—281 R |
| 3,511,675 | 5/1970 | Carlston | 106—281 R |
| 3,338,849 | 8/1967 | Johnson | 260—285 AS |

MORRIS LIEBMAN, Primary Examiner

S. L. FOX, Assistant Examiner

U.S. Cl. X.R.

260—28.5 A, 28.5 B, 28.5 D, 28.5 AS, 41 R

UNITED STATES PATENT OFFICE
CERTIFICATE OF CORRECTION

Patent No.  3,849,355            Dated  November 19, 1974

Inventor(s)         Kaoru YAMAGUCHI ET AL

It is certified that error appears in the above-identified patent and that said Letters Patent are hereby corrected as shown below:

Column 8, line 2 of Claim 2:  cancel "fragments"

Column 8, line 2 of Claim 3:  after "are" insert -- fragments --

Signed and sealed this 14th day of January 1975.

(SEAL)
Attest:

McCOY M. GIBSON JR.            C. MARSHALL DANN
Attesting Officer              Commissioner of Patents